United States Patent [19]

Stone

[11] Patent Number: 4,516,565
[45] Date of Patent: May 14, 1985

[54] SUN SENSING CONTROL DEVICE

[76] Inventor: Milton Stone, 7121 Catalina St., Spring Hill, Fla. 33526

[21] Appl. No.: 573,055

[22] Filed: Jan. 23, 1984

[51] Int. Cl.$^3$ .............................................. F24J 3/02
[52] U.S. Cl. .................................. 126/419; 126/416
[58] Field of Search .............. 126/418, 419, 421, 422, 126/416; 337/306, 289; 219/517; 236/99 D; 137/79-80, 78.1, 78.5

[56] References Cited

U.S. PATENT DOCUMENTS

| | | | |
|---|---|---|---|
| 3,620,206 | 11/1971 | Harris, Jr. ............................ | 126/435 |
| 4,063,545 | 12/1977 | Hapgood ............................ | 126/419 |
| 4,069,971 | 1/1978 | Swanson ............................ | 126/422 |
| 4,083,490 | 4/1978 | Cunningham et al. ............. | 126/437 |
| 4,088,119 | 5/1978 | O'Hanlon ............................ | 126/419 |
| 4,232,656 | 11/1980 | Teagan ............................... | 126/422 |
| 4,393,527 | 7/1983 | Ramey ............................... | 126/416 |

Primary Examiner—James C. Yeung
Attorney, Agent, or Firm—Bernard L. Kleinke

[57] ABSTRACT

The sun sensing control device includes an upright hollow elongated housing having a sealed compartment therein containing fluid. An electrical transducer is mounted at least partially within the compartment. The transducer responds to changes in the characteristics of the fluid within the compartment when solar radiation, impinging on the housing, heats the fluid in the compartment. In response to such changes, the transducer provides an electrical signal indicative of the presence of adequate solar radiation for energizing a solar heating system.

17 Claims, 7 Drawing Figures

U.S. Patent    May 14, 1985    4,516,565
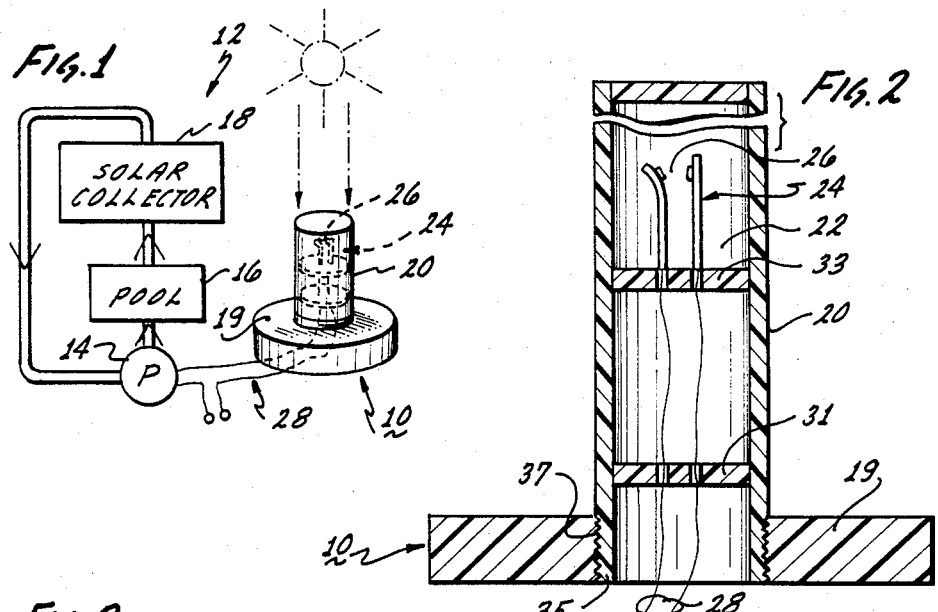
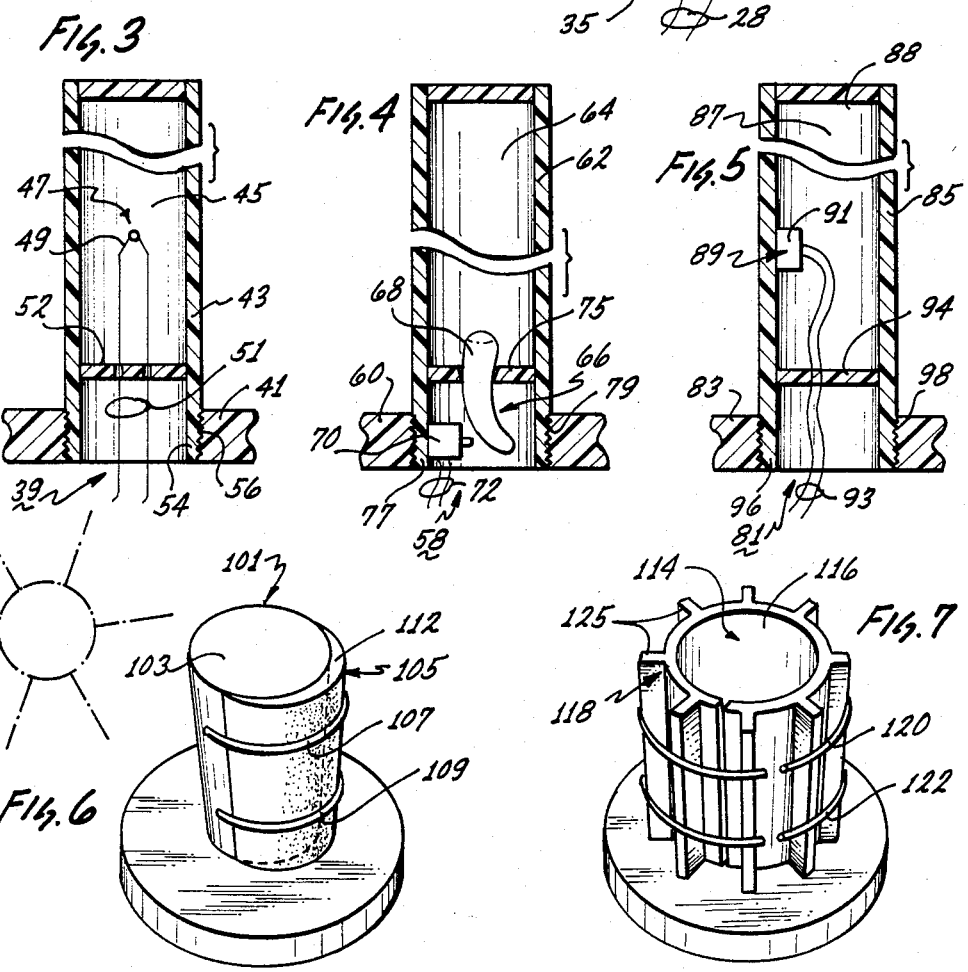

SUN SENSING CONTROL DEVICE

DESCRIPTION

1. Technical Field

The present invention relates in general to a sun sensing control device, and it more particularly relates to a control device adapted to be used in conjunction with solar heating equipment.

2. Background Art

There have been many different types and kinds of sensing devices. For example, reference may be made to the following U.S. Pat. Nos.: 3,931,603; 3,946,352; 4,282,506; and 4,304,219. The foregoing-mentioned patents disclose a thermocouple sensing device for a solar heating system, and other thermally sensitive switches or the like. While such devices may be satisfactory for some applications, it would be highly desirable to have a solar sensing device, which could be used in conjunction with a solar heating system to enable it to function fare more efficiently.

Conventional solar systems include pumps for recirculating water or other substances from a swimming pool, hot water heater, or other such reservoirs or containers, through a solar collector for heating the water. While such systems have been acceptable for some applications, a problem can arise where an inadequate supply of solar energy is available. On cloudy days, or at sundown, should the pump continue to circulate the water through the solar collector, the water is cooled rather than heated. In this regard, in the absence of adequate solar energy, the solar collector permits heat to escape from the recirculating water, thereby causing it to cool.

Such an undesirable and unwanted situation is obviously counter-productive. The water loses its heat, and electrical energy to drive the pump is wasted.

Thus, it would be highly desirable to have a sun sensing control device, which could de-energize the pump in the absence of an adequate availability of solar energy. Therefore, the sun sensor should be adapted to detect the relative position of the sun, and only respond when adequate solar radiation is present for supplying heat to the solar system, and not during other times of the day. In this manner, the heat stored in the water or other liquid, would be conserved. Also, since the pump is de-activated during substantial periods of time during each day, the life of the pump would be greatly prolonged, and the energy for powering it would be conserved.

Such a sun sensor should only cause the activation of the pump when sufficient solar energy is available at sufficiently high intensities for heating the water or other substance utilized in the solar heating system. The pump should not be activated merely in the presence of low intensity light conditions such as at sunrise and at sunset when solar intensity is at its lowest level.

Such a device should not cycle on and off during cloudy conditions when the sun is temporarily blocked from view, such as when a cloud passes between the earth and the sun. Instead, the device should maintain the pump activated when a cloud temporarily blocks solar irradiation.

The sun sensing device should be relatively inexpensive to manufacture, and should be highly reliable in its operation. It should be useful for not only industrial and commercial applications, but also by an unskilled person for use in the home. Also, it should be adapted to be installed in existing solar heating systems in a convenient manner.

DISCLOSURE OF INVENTION

Therefore, the principal object of the present invention is to provide a new and improved sun sensing control device which is adapted to detect the relative position of the sun for de-activating a solar heating system.

Another object of the present invention is to provide such a new and improved sensing device, which does not cause the solar heating system to cycle on and off during cloudy days, and which is relatively inexpensive to manufacture and is easy to install and use.

Briefly, the above and further objects of the present invention are realized by providing a sun sensing control device which is adapted to control a solar heating system to prevent the recirculation of water or other substance therethrough, in the absence of adequate solar radiation.

The sun sensing control device includes an upright hollow elongated housing having a sealed compartment therein, containing fluid. An electrical transducer is mounted at least partially within the compartment. The transducer responds to changes in the characteristics of the fluid within the compartment when solar radiation, impinging on the housing, heats the fluid in the compartment. In response to such changes, the transducer provides an electrical signal indicative of the presence of adequate solar radiation for energizing a solar heating system.

The housing is substantially longer in length than its transverse dimension, to provide a smaller effective external exposed upper area for exposure to the higher intensity solar radiation, and to provide a larger effective external exposed lower area for exposure to the lower intensity solar radiation. Thus, as the intensity of solar radiation varies throughout a given day, the temperature of the fluid within the device does not rise excessively, so that the transducer can cause the de-activation of the solar system, at sunset or when the solar radiation intensity decreases below a worthwhile level for heating the system.

Since the transducer only responds to changes in the characteristics of the fluid, the device possesses an inherent time delay to prevent the cycling on and off, during cloudy conditions.

DESCRIPTION OF THE DRAWINGS

The above-mentioned and other objects and features of this invention and the manner of attaining them will become apparent, and the invention itself will best be understood by reference to the following description of an embodiment of the invention taken in conjunction with the accompanying drawings, wherein:

FIG. 1 is a partly schematic, pictorial view of a sun sensing control device, which is constructed in accordance with the present invention, and which controls a solar heating system;

FIG. 2 is a fragmentary vertical sectional elevational view of the device of FIG. 1;

FIG. 3 is a fragmentary vertical sectional elevational view of another sun sensing device, which is also constructed in accordance with the present invention;

FIG. 4 is a fragmentary vertical sectional elevational view of still another sun sensing control device, which is also constructed in accordance with the present invention;

FIG. 5 is a fragmentary vertical sectional elevational view of yet another sun sensing control device, which is also constructed in accordance with the present invention;

FIG. 6 is a pictorial view of a further sun sensing control device, which is also constructed in accordance with the present invention; and FIG. 7 is a pictorial view of still a further sun sensing control device, which is also constructed in accordance with the present invention.

BEST MODE FOR CARRYING OUT THE INVENTION

Referring now to the drawings, and more particularly to FIGS. 1 and 2 thereof, there is shown a sensor 10, which is constructed in accordance with the present invention, and which is adapted to control a solar heating system 12. The solar heating system 12 generally comprises a liquid pump 14, which transfers water from a swimming pool 16 through a solar collector 18 and back to the pump 14 for recirculation purposes.

It should be understood that while the solar heating equipment 12 is used to heat water in a swimming pool 16, the sensor 10 can be used for different types and kinds of solar heating systems. Such equipment may include water heaters, space heaters, and the like.

The sensor 10 generally comprises a circular base 19, which supports an upright, elongated hollow housing 20 having a sealed compartment 22 disposed therein. The compartment is filled with a fluid in the form of air. The outer surface of the housing 20 is preferably of a black color to absorb solar radiation. The housing 20 is circular in cross-section througout its axial length.

A transducer, generally indicated at 24 is disposed within the sealed compartment 22, and is preferably in the form of a bimetallic thermally-responsive switch 26 which is adapted to close to provide an electrical signal for the system 12, when the air within the sealed compartment 22 becomes heated to a predetermined temperature. When closed, a pair of control leads 28 from the transducer 24 close an electrical circuit to the pump 14 for energizing it by means of source of suitable electrical power, as shown.

An internal bottom wall 31 seals the compartment 22, and includes a pair of openings therein to facilitate the passage of the control leads 28. It should be understood that the openings are sealed to maintain the compartment 22 in an airtight condition.

An inner transducer support wall 33 is disposed within the compartment 22 for supporting the transducer 24. An outer threaded end portion 35 of the tubular housing 20 is tightened into a threaded hole 37 in the central portion of the base 19. In this manner, the housing 37 can be removed from the base 19 in a convenient manner, and the housing 20 can then be attached, if desired, in a convenient manner to an outdoor electrical box (not shown) in an upright manner.

The housing is substantially longer than its transverse dimension, to provide a small effective external exposed upper area for exposure to the higher intensity solar radiation, and to provide a larger effective external exposed lower area for exposure to the lower intensity solar radiation. Thus, as the intensity of solar radiation varies throughout a given day, the temperature of the fluid within the device does not rise excessively so that the transducer can cause the de-activation of the solar system at sunset or when the solar radiation intensity decreases below a worthwhile level for heating the system.

Since the transducer only responds to changes in the characteristics of the fluid, the device possesses an inherent time delay to prevent the cycling on and off during cloudy conditions.

Considering the housing 20 in greater detail, the housing 22 and its base 19 are preferably composed of suitable plastic material. However, it is to be understood that it may also be composed of other suitable materials, such as metal, or ceramic materials.

The housing 20 is substantially longer in length than its transverse dimension, to provide a smaller effective external exposed upper area for exposure to the higher intensity solar radiation, as well as to provide a larger effective external exposed lower area for exposure to the lower intensity solar radiation. The axial length of the housing 22 is preferably five to twenty times greater than its outside diameter. The most preferred dimensions of the housing 20 are in the proportion of the length being about seven times its outside diameter.

Due to the elongated shape of the housing 20, as the intensity of solar radiation varies throughout a given day, the temperature of the air in the compartment 22 does not rise excessively, so that the transducer can cause the de-activation of the solar system when the solar radiation intensity decreases below a worthwhile level for heating the system 12. Under many ambient conditions, a preferred temperature of the air within the compartment 22 is about 105° F. However, the desired temperature can be higher or lower, depending on the expected ambient temperature conditions at the location of use of the device 10.

When the sun is rising or setting, the radiation is directed substantially perpendicularly to the side wall of the housing 20. Thus, the low intensity solar radiation is absorbed to a great extent to heat the air within the compartment 22.

However, as the sun rises still further, the angle of incidence of the solar radiation decreases relative to the vertical outer surface of the housing 20. Thus, a progressively increasingly smaller amount of radiation is absorbed by the housing 20. While this is occurring, the intensity of the solar radiation is increasing. The overall effect is to maintain the temperature of the air in the compartment 22 elevated above the pre-determined temperature. As a result, the switch 26 remains closed but the temperature of the air within the compartment 22 does not build up excessively.

Once the sun is disposed above the device 10, the solar radiation is directed substantially perpendicularly to the outer surface of a circular top wall 38 of the housing 20. Thus, only a small effective area is exposed to the sun. Thus, while the solar radiation is at its highest level in such circumstances, the amount of solar radiation absorbed by the housing 20 does not cause an excessive temperature increase.

As the sun goes down, the angle of incidence of the solar radiation on the housing side wall progressively increases over a relatively larger surface area, as compared to the external surface area of the top wall 38. Also, of course, the intensity level of the solar radiation decreases. The overall effect is to maintain the temperature necessary to maintain the temperature of the air in the compartment 22 above the pre-determined temperature necessary to maintain the normally-opened switch 26 closed, until the solar radiation becomes inadequate for heating the solar collector 18 of the system 12.

Once the temperature of the compartment air falls below the pre-determined temperature, the switch 26 opens to cause the pump 14 to be de-energized by opening the power circuit to it. Thus, the re-circulation of the water ceases, to prevent it from cooling inadvertently due to an inadequate supply of higher intensity solar radiation.

Referring now to FIG. 3, there is disclosed another sun sensing control device 39, which is also constructed in accordance with the present invention, and which is used to control a solar heating system (not shown), similar to the solar heating system 12 of FIG. 1.

The sensing device is constructed similarly to the device 10, and generally comprises a circular base 41 of a hollow tubular housing 43 in an upright manner. The base 41 and the housing 43 are generally similar to the respective base 19 and the housing 41. A sealed compartment 45 is disposed within the housing 43 for confining fluid in the form of air therein. A transducer, generally indicated at 47 is mounted within the sealed compartment 45, and is in the form of a thermocouple 49, to sense temperature changes in the air within the sealed compartment 45. The thermocouple 49 serves a similar purpose as the bimetallic switch 45.

A pair of control leads 51 extend through a pair of openings in an internal bottom wall 52, which seals the compartment 45 of the housing 62. It should be understood that the openings in the wall 52 are sealed about the leads 51.

An outer threaded end 54 of the tubular housing 43 is tightened into a threaded central hole 56 in the base 41, in a similar manner as the housing 20 is attached to base 19 of the sensing device 10.

Referring now to FIG. 4, there is shown still another sun sensing control device 58, which is constructed in accordance with the invention. The sun sensing device 58 is adapted to control a solar heating system (not shown) similar to the solar heating system 12 of FIG. 1.

The sensing device 58 generally comprises a circular base 60 for supporting a hollow elongated housing 62 in an upright manner. The device 58 is similar to the sensing device 10, except that a different type of transducer is employed.

A transducer 66 is mounted within a sealed compartment 64 within the housing 62, and is in the form of a Bourdon tube 68, which co-acts with a micro-switch 70. In this regard, when the temperature of the air in the sealed compartment 64 rises, causing an increase in the pressure above a pre-determined value, the Bourdon tube 68 moves to actuate the micro-switch 70.

A pair of control leads 74 from the micro-switch 70 is connected electrically to a solar heating system (not shown), for controlling it in a manner similar to the manner in which the sensing device 10 controls the system 12.

An internal bottom wall 75 serves to seal the compartment 64, and also supports the Bourdon tube 68 with its upper end disposed within the sealed compartment 64 and its lower end disposed adjacent to an actuator for the micro-switch 70. The tubular housing 62 includes an outer threaded end 77, which is fixedly received within a threaded hole 79 centrally disposed within the base 60.

Referring now to FIG. 5, there is shown another sun sensing control device 81, which is constructed in accordance with the present invention. The sensor 81 is constructed similarly to the previously-described sun sensing devices, except that the transducing device 89 is responsive to pressure changes instead of temperature changes.

The sun sensing device 81 generally comprises a circular base 83 for supporting an elongated hollow tubular housing 85 in an upright manner, and in a similar manner to the previously-described sun sensing devices. The elongated housing 85 includes a sealed compartment 87 having a suitable fluid in the form of a liquid 88 confined therein. A transducer 89 is mounted within the liquid filled sealed compartment 87, and is in the form of a pressure switch 91. The pressure switch 91 responds to changes of pressure of the liquid 88 and closes when the pressure rises above a pre-determined value to enable the device 81 to function in a manner similar to the functioning of the device 10.

A pair of control leads 93 from the pressure switch 91 extend through a pair of openings in an internal bottom wall 94 of the housing 85. The bottom wall 94 serves to seal the liquid in the compartment 87. A threaded bottom end 96 of the housing 85 is threaded into a threaded hole 98 in the base 83 in a similar manner as the previously described sun sensing devices.

Referring now to FIG. 6, there is shown a further sun sensing control device 101, which is constructed in accordance with the present invention, and which is similar in construction to the construction of the sun sensing device 10 of FIG. 1, except that it is adapted to be used in colder climates. In this regard, the device 101 prevents conduction heat loss from its lee-side (the side facing away from the sun).

The sensing device 101 includes a hollow tubular housing 103, and has a semi-circular or C-shaped half tube 105 which extends about the outer surface of the tubular housing 103 on the lee-side thereof. A pair of spring clips 107 and 109 releasably secure the half-tube to the housing 103.

The tube 105 is preferably composed of suitable insulating material, such as fiber-glass material, or the like to adapt it to insulate the lee-side of the housing 103 to prevent the escape of heat by conduction from the housing 103 in colder climates.

The tube 105 has a thickened central portion 112 extending throughout its length, and is C-shaped throughout its axial length.

Referring now to FIG. 7, there is shown yet another sun sensing control device 114, which is constructed in accordance with the present invention, and which is similar in construction to the sun sensing device of FIG. 1. The sun sensing device 114 is adapted to be used in warmer climates, in that unwanted heat buildup is dissipated from the device in a convenient manner.

The sun sensor 114 includes a tubular housing 116, and has a radiator tube 118, which fits snugly about the outer surface of the housing 116 in a similar manner as a sleeve, and which is black in color. A pair of spring clips 120 and 122 fix releasably and tightly the tube 118 to the housing 116.

The tube 118 has a plurality of cooling fins 105 radially extending therefrom to faciliate the dissipation of unwanted heat within the internal compartment (not shown) of the device 114. In order to facilitate the heat transfer, a silica-gel material is disposed between the radiator tube 118 and the outer surface of the tubular housing 116. The tube 118 is composed of a suitable conductor, such as aluminum to enhance heat conduction from the interior of the sensor 114.

While particular embodiments of the present invention have been disclosed, it is to be understood that various different modifications are possible and are contemplated within the true spirit and scope of the appended claims. For example, different types and kinds of materials may be employed for the housing of the devices, and such materials may include plastic, metal, and ceramic, as well as other materials. Also, the housing may have other cross-sectional areas, such as rectangular and triangular configurations. There is no intention, therefore, of limitations to the exact abstract or disclosure herein presented.

I claim:

1. A sun sensing control device for controlling a solar heating system, comprising:

base means;

a hollow elongated housing being mounted on said base means in an upright disposition and having a sealed compartment therein confining fluid;

an electrical transducer mounted at least partially within said compartment and responsive to changes in the characteristics of the fluid confined within said compartment for generating an electric signal indicative of the presence of adequate solar radiation to cause the activation of the solar heating system; and said housing being substantially longer in length than its transverse dimension to provide a small effective external exposed upper opaque area for the higher intensity solar radiation, and to provide a larger effective external exposed lower opaque area for the lower intensity solar radiation, the external surfaces of said upper and lower areas having solar radiation absorbing color, whereby the temperature of said fluid does not tend to become excessively elevated and said transducer is energized or de-energized only after a given time delay interval determined by the heat absorbing and releasing characteristics of the fluid respectively.

2. A sun sensing control device according to claim 1, wherein said transducer includes a bimetallic thermally-responsive switch.

3. A sun sensing control device according to claim 1, wherein said transducer includes a thermocouple.

4. A sun sensing control device according to claim 1, wherein said transducer includes a Bourdon tube mounted for co-acting with a micro-switch.

5. A sun sensing control device according to claim 1, wherein said transducer includes a pressure sensitive switch.

6. A sun sensing control device according to claim 1, wherein said fluid is a gas.

7. A sun sensing control device according to claim 6, wherein said fluid is air.

8. A sun sensing control device according to claim 1, wherein said fluid is a liquid.

9. A sun sensing control device according to claim 8, wherein said fluid includes water.

10. A sun sensing control device according to claim 1, further including an insulating member attached to an outer portion of the back side of the side wall of said housing for resisting heat transfer from a portion of the housing facing away from the sun, said member being substantially thicker in cross-section at the extreme opposite portion of the backside of the side wall, than the remaining portions thereof.

11. A sun sensing control device according to claim 10, wherein said member is composed of fiber glass, and is held in place on said housing by clip means.

12. A sun sensing control device according to claim 1, further including radiator means attached to the outer surface of the housing and surrounding it for facilitating heat transfer therefrom.

13. A sun sensing control device according to claim 12, wherein said radiator means is tubular in shape for surrounding said housing and includes a plurality of radially extending black fins, said radiating means being composed of a metal.

14. A sun sensing control device according to claim 13, wherein the length of said housing is between five and twenty times the transverse dimension thereof.

15. A sun sensing device according to claim 14, wherein the ratio of length to transverse dimension is about seven.

16. A sun sensing device according to claim 1, wherein the length of said housing is between five and twenty times the transverse dimension thereof.

17. A sun sensing device according to claim 16, wherein the ratio of length to transverse dimension is about seven.

* * * * *